Aug. 25, 1925.                              1,550,664
F. J. AUCHLY
BELT LACING NEEDLE
Filed Feb. 12, 1924
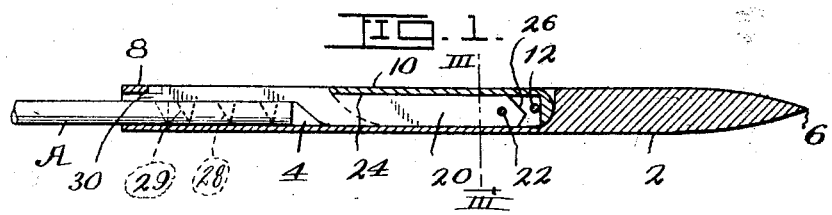
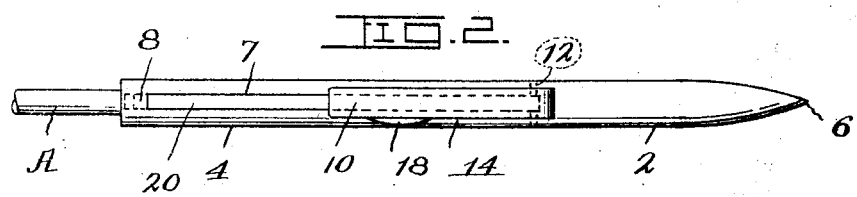
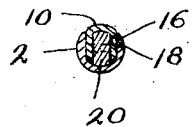
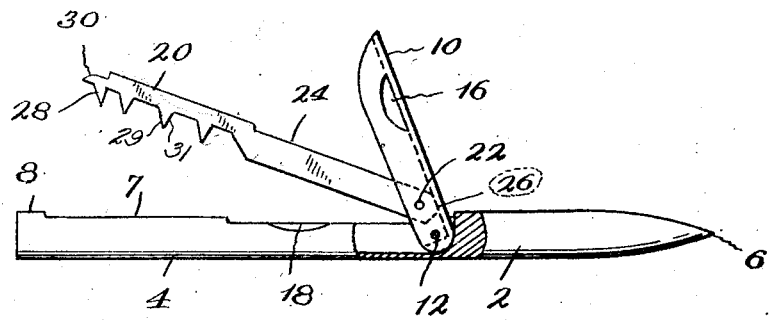
Inventor:
Frank J. Auchly,
By F. G. Fischer,
Attorney.
Witness:
Fred G. Fischer.

Patented Aug. 25, 1925.

1,550,664

UNITED STATES PATENT OFFICE.

FRANK J. AUCHLY, OF KANSAS CITY, KANSAS.

BELT-LACING NEEDLE.

Application filed February 12, 1924. Serial No. 692,253.

*To all whom it may concern:*

Be it known that I, FRANK J. AUCHLY, a citizen of the United States, residing at Kansas City, in the county of Wyandotte and State of Kansas, have invented certain new and useful Improvements in Belt-Lacing Needles, of which the following is a specification.

My invention relates to that type of needle employed in lacing belts and the present invention is an improvement over the one disclosed by my U. S. Letters Patent No. 1,209,244.

One important difference between my present invention and the one disclosed by said patent resides in the arrangement and operation of the gripping bar which is now pivoted on the handle bar instead of the needle and in such manner that when it moves inwardly to grip the lacing it also moves longitudinally beneath a ledge on the needle and thereby becomes positively locked so that the lacing cannot pull out of the needle.

Another difference resides in the manner in which the handle bar is mounted and controls the gripping bar, the construction and operation being such that when said handle bar is swung outwardly it swings the toothed end of the gripping bar outwardly and entirely free of the needle, so that one end of the lacing can be freely inserted in said needle and removed from the same without hindrance from the gripping bar.

Another difference is that the handle bar is pivoted to the needle instead of only to the gripping bar, thereby rendering the operation more easy and convenient.

In order that the invention may be fully understood, reference will now be had to the accompanying drawing, in which:

Fig. 1 is a longitudinal sectional view of the needle in the act of holding one end of the belt lacing.

Fig. 2 is a plan view of the needle with a portion of the lacing.

Fig. 3 is a cross section on line III—III of Fig. 1.

Fig. 4 is a side elevation partly in section showing the handle bar and the gripping bar in raised or outward position.

Referring now in detail to the various parts, 2 designates a needle having a tubular portion 4 and a pointed end 6. One side of the tubular portion 4 is cut out to form a slot 7 and a ledge 8, which latter is located at the rear end of the needle 2.

10 designates a handle bar which is mounted on a pivot 12 in the forward end of the tubular portion 4 and is adapted to fold or close down into the wide portion 14 of the slot 7. The handle bar 10 is provided at one side with a depression 16 for reception of the thumb nail whereby said handle bar 10 may be swung outwardly to the position shown by Fig. 4, the depression 16 registering with a corresponding depression 18 in the needle 2 when the handle bar 10 is in closed position.

The handle bar 10 is U-shaped in cross section as shown by Fig. 3, to receive the gripping bar 20 which is operably connected at one end to said handle bar 10 by a pivot 22. The back of the gripping bar 20 has an offset 24, so that when it and the handle bar 10 are in closed position as shown by Fig. 1, the back of said handle bar 10 and the exposed portion of the back of the gripping bar 20 will be flush with each other and the adjacent surface of the needle 2, thereby permitting the same to pass readily through the holes in a belt when lacing the ends thereof together. The pivoted end of the gripping bar 20 is beveled as indicated at 26 to fit the inner surface of the back of the handle bar 10, so that when the same is opened to the position shown by Fig. 4, it will also open said gripping bar 20.

The gripping bar 20 is provided with teeth 28 and at its free end with an offset 30, which is adapted to engage under the ledge 8 as shown by Fig. 1, and thus firmly lock the toothed portion of said gripping bar 20 firmly in engagement with the belt lacing A. The teeth 28 have beveled sides 29 and abrupt sides 31, which latter prevent the lacing A from pulling out of the needle 2, when the same is drawing the lacing through the holes in a belt.

In practice the handle bar 10 and the gripping bar 20 are adjusted to the open position disclosed by Fig. 4 and one end of the belt lacing A is inserted in the rear tubular portion 4 of the needle 2. The handle bar 10 is then forced downwardly to closed position and forces the gripping bar 20 downwardly into the slotted tubular portion of the needle 2, causing the teeth 28 to become firmly embedded in the lacing A. As the gripping bar 20 moves downwardly in advance of the handle bar 10 it also moves longitudinally, due to the arc described by the pivot 22 about the pivot 12, and carries the offset 30 beneath the ledge 8, thereby firmly locking said gripping bar in closed position until opened by manually raising the handle bar 10.

By pivotally connecting one end of the gripping bar 20 to the handle bar 10 instead of pivoting it directly to the needle as shown in my patent hereinbefore mentioned, said gripping bar may be provided with a greater number of teeth 28 and thereby obtain a better grip on the lacing A, and by having its offset 30 pass beneath the ledge 8 it is locked more securely in closed position than the gripping bar 3 shown by said patent.

From the foregoing description, taken in connection with the drawing, it is apparent that I have provided a needle embodying the advantages above pointed out, and while I have shown and described the preferred construction, combination and arrangement of parts, I reserve the right to make such changes as properly fall within the spirit and scope of the invention as claimed.

Having thus described my invention, what I claim and desire to secure by Letters Patent, is:

1. A belt lacing needle pointed at one end and having a slotted tubular portion for the insertion of a lacing, a handle bar pivoted to said needle and adapted to fold into the slotted tubular portion thereof, and a gripping bar pivoted to said handle bar and adapted to be forced thereby into the slotted tubular portion of the needle to grip the lacing, or be carried free of the needle to release the lacing.

2. A belt lacing needle pointed at one end and having a slotted tubular portion for the insertion of a lacing, a handle bar of U-form in cross section pivoted to said needle and adapted to fold into the slotted tubular portion thereof, and a toothed gripping bar pivoted at one end in said handle bar and adapted to be forced thereby into the slotted tubular portion of the needle to grip the lacing, the pivoted end of said gripping bar being beveled for engagement with the inner surface of the back of the handle bar so that when the same is opened it will swing the free end of the gripping bar free of the lacing and the needle.

3. A belt lacing needle pointed at one end and having a slotted tubular portion with a ledge, a handle bar pivoted to said needle and adapted to fold into the slotted tubular portion thereof, and a toothed gripping bar pivotally connected to said handle bar and having an off-set at its free end which is forced beneath the ledge on the needle when the handle bar is folded.

In testimony whereof I affix my signature.

FRANK J. AUCHLY.